Sept. 18, 1956
C. L. LOVERCH ET AL
2,763,324
INDEX CUTTER HAVING WORK CARRIAGE MOVABLE
RELATIVE TO THE CUTTER
Filed March 14, 1952
7 Sheets-Sheet 4
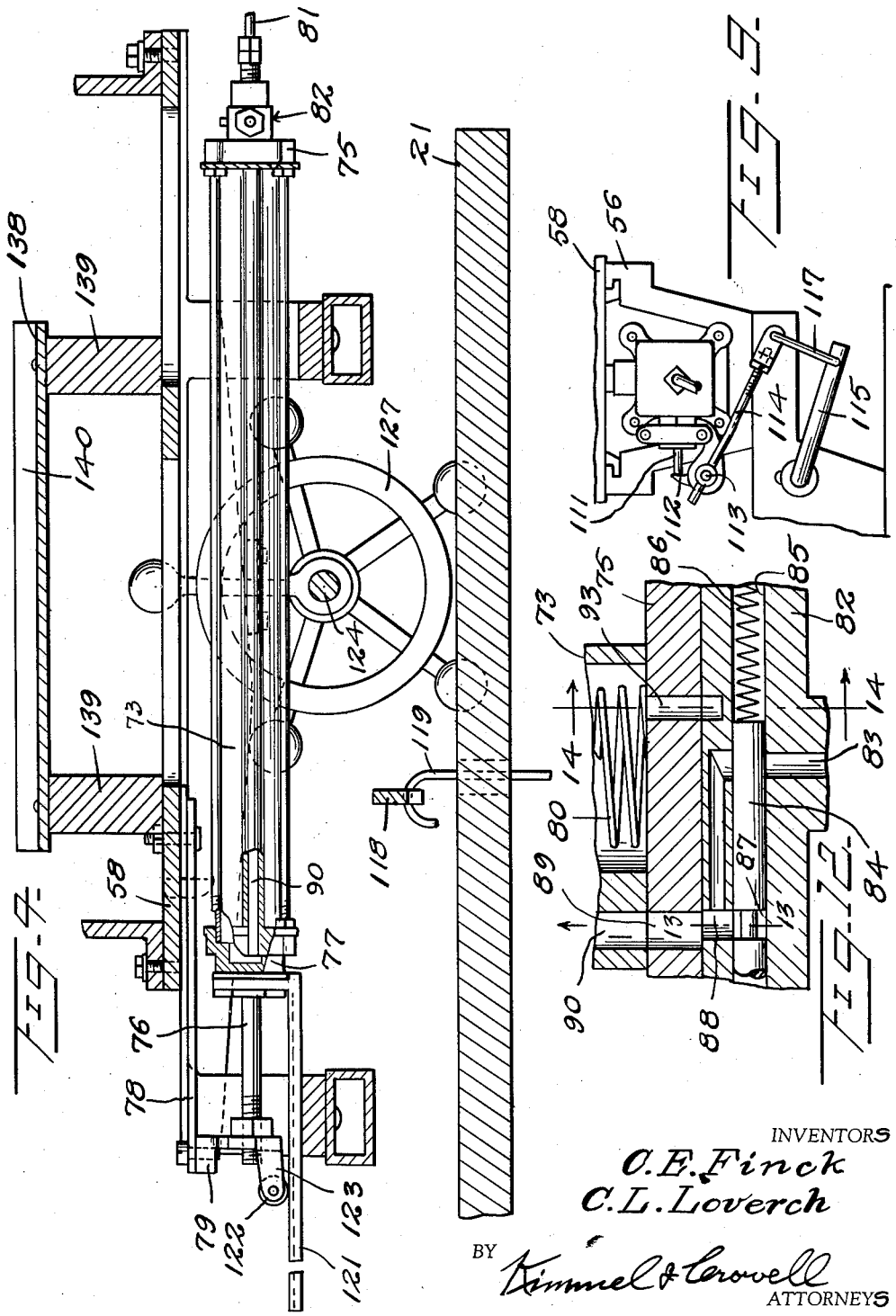
INVENTORS
O. E. Finck
C. L. Loverch
BY Kimmel & Crowell
ATTORNEYS

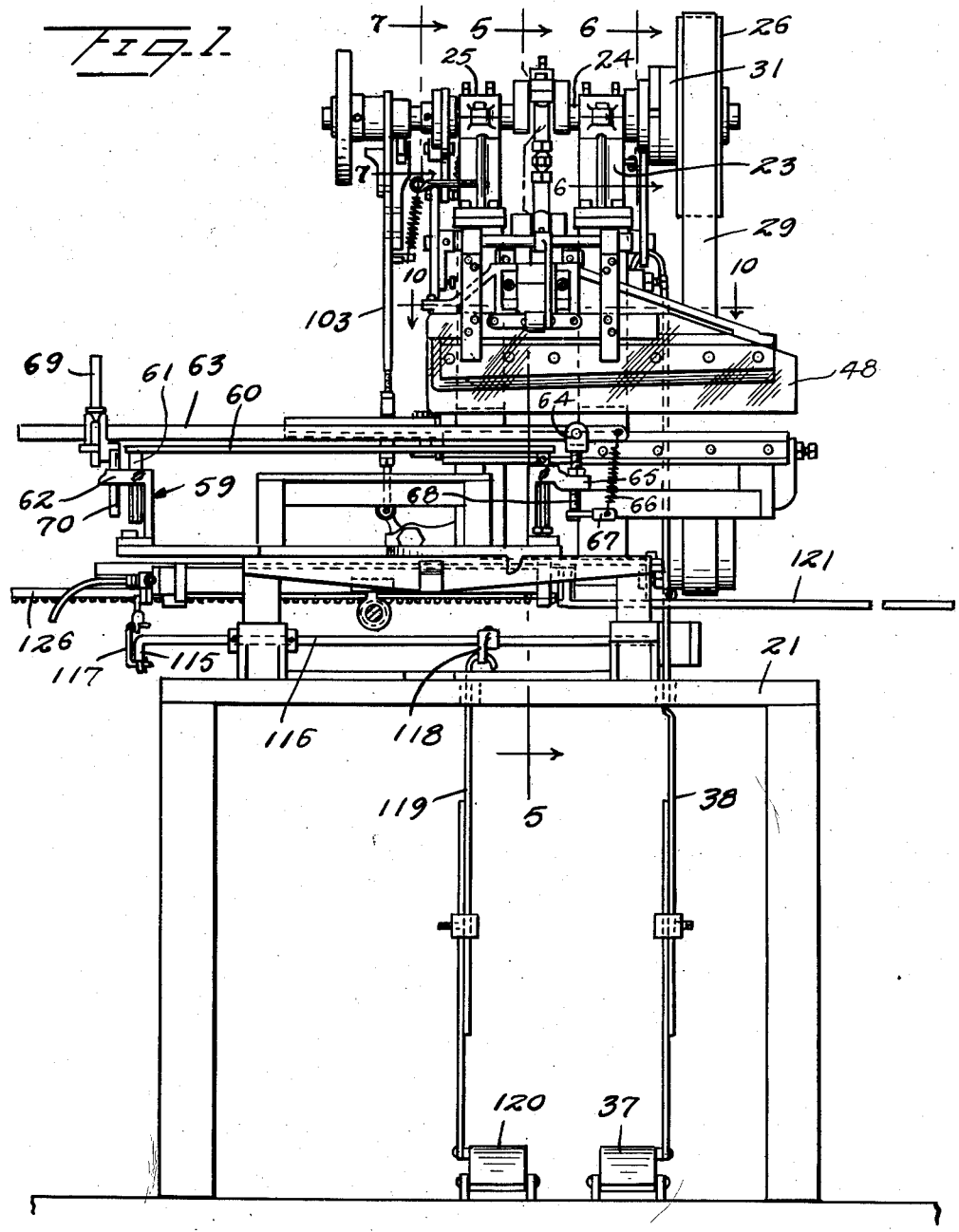

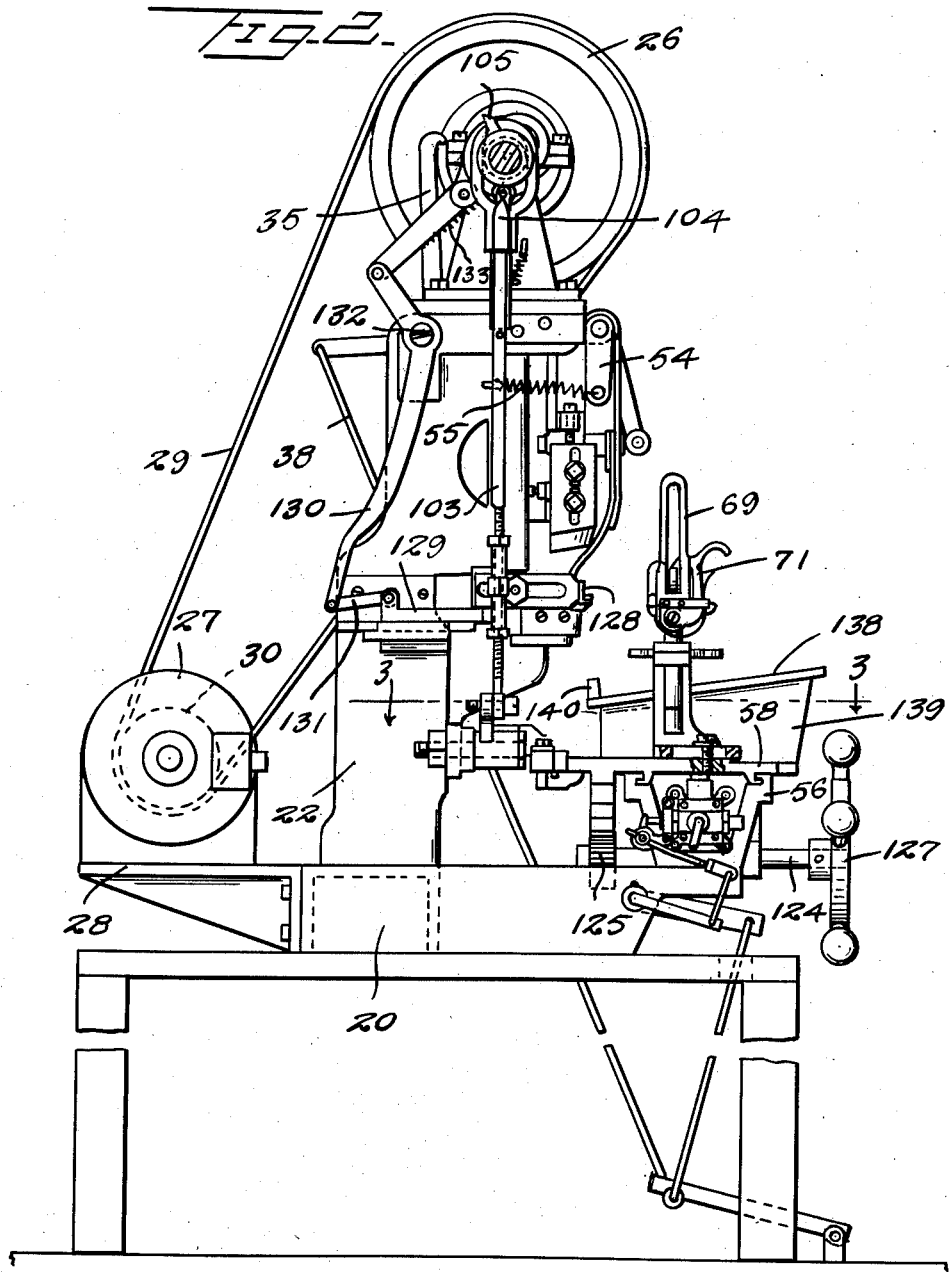

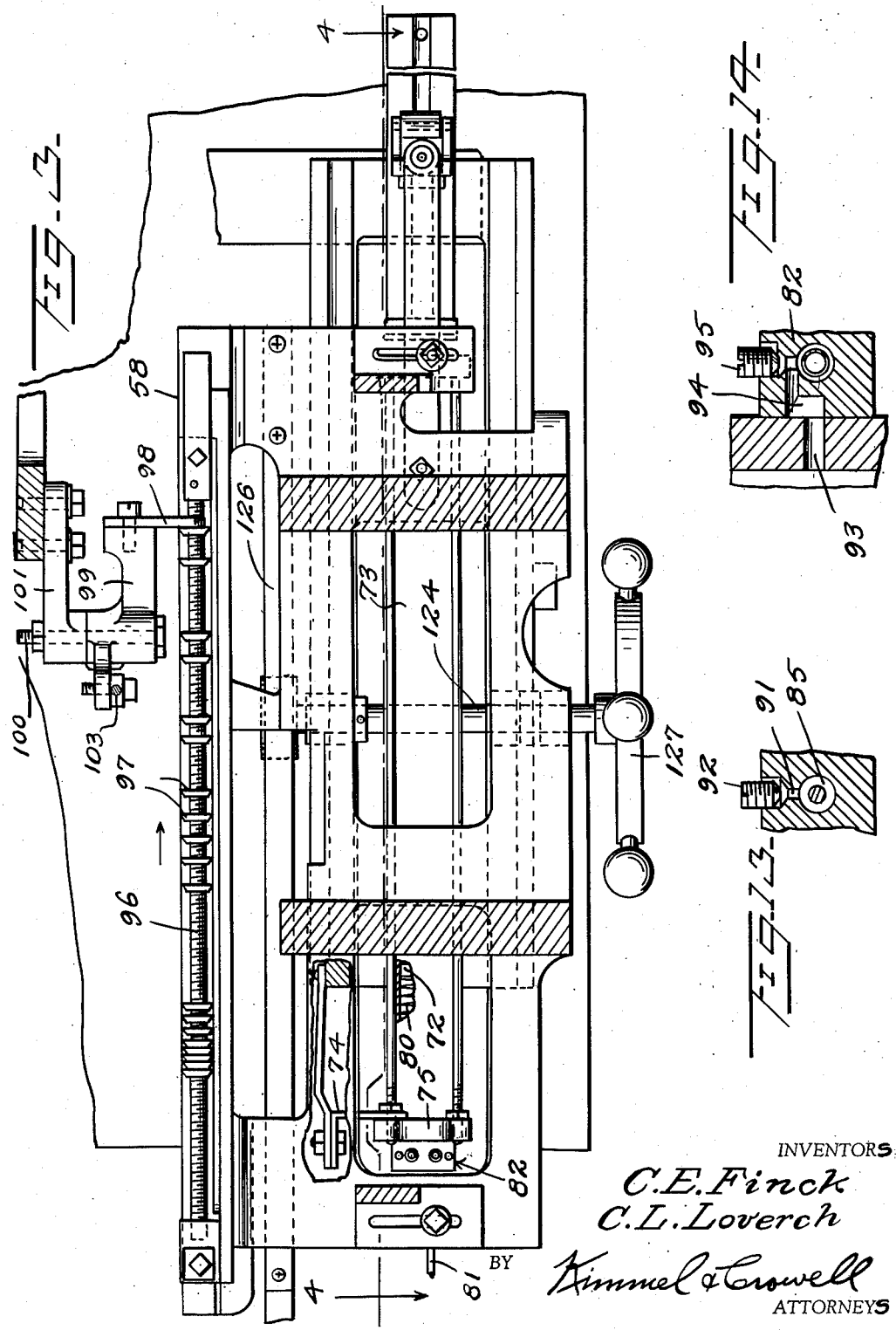

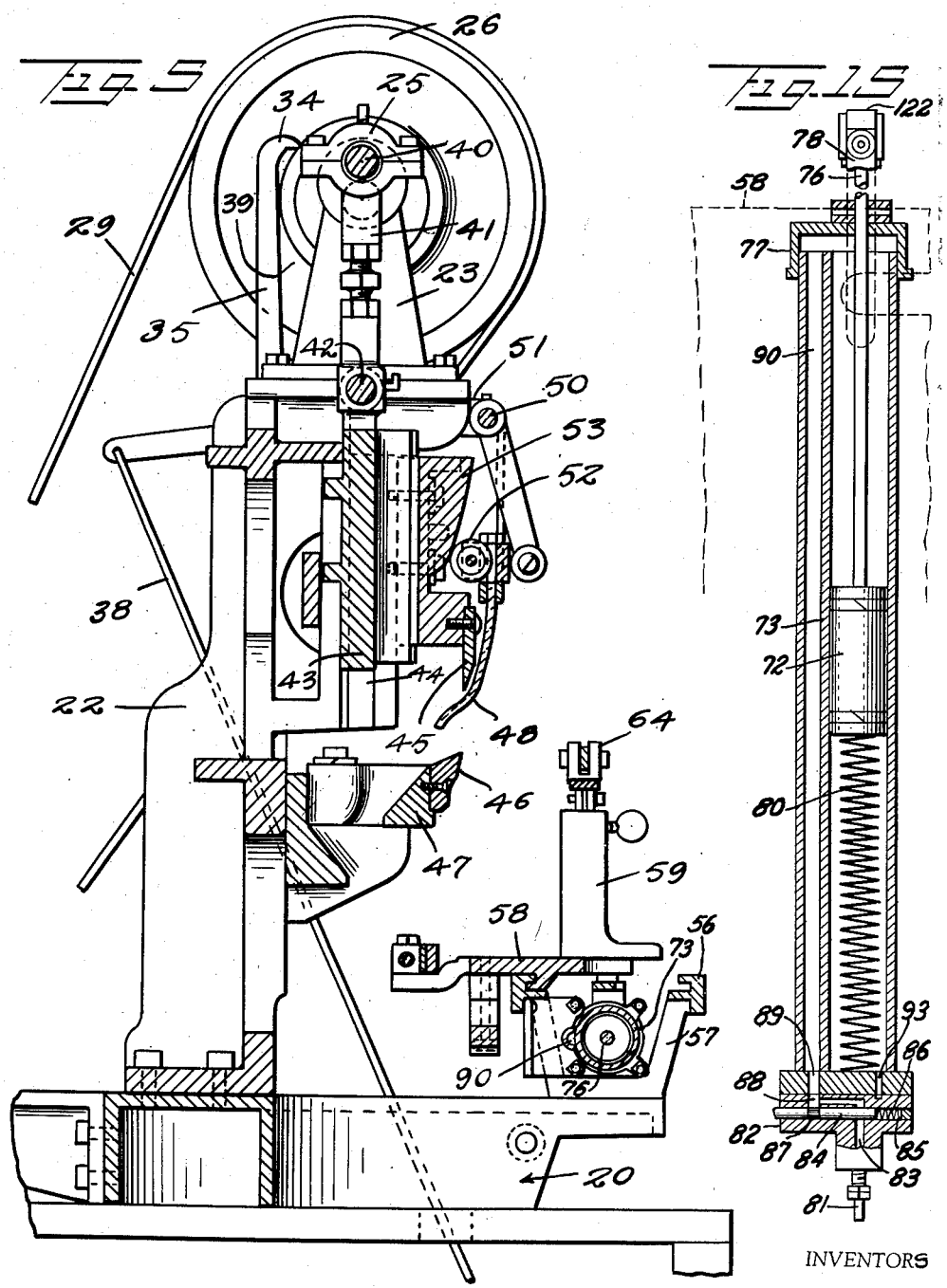

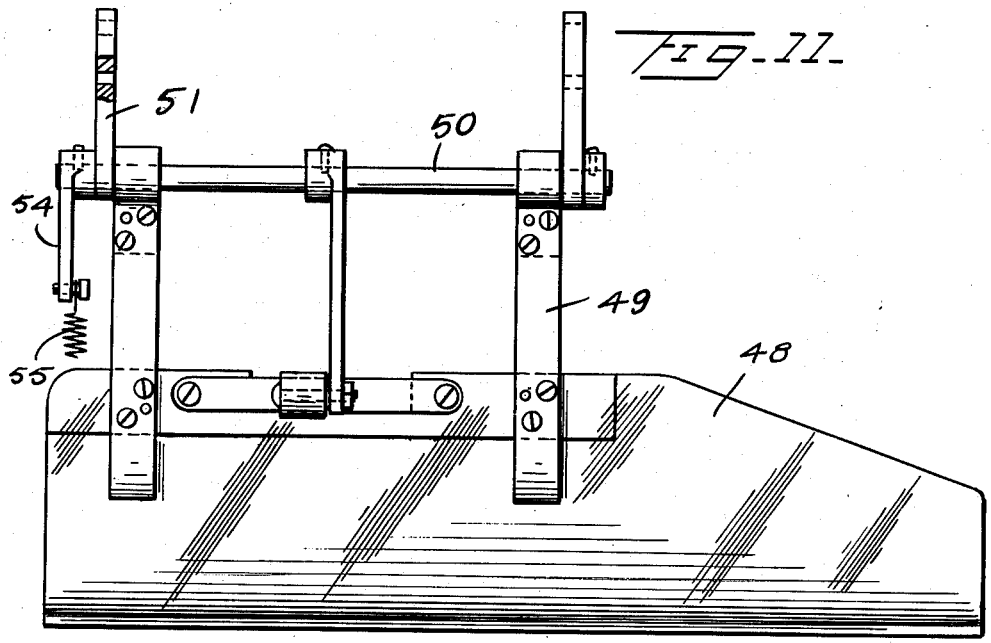
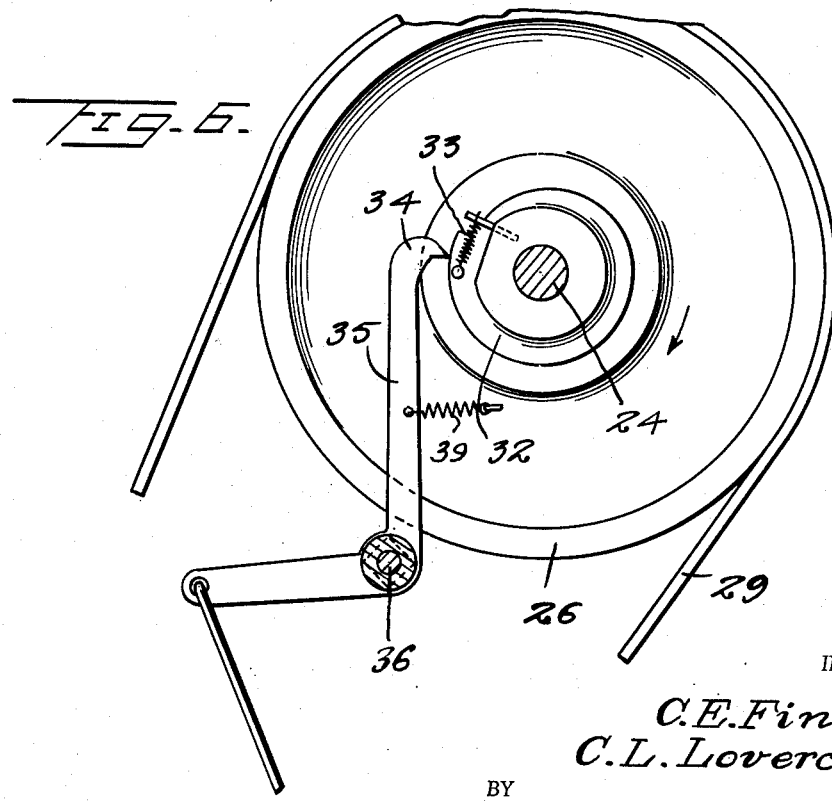

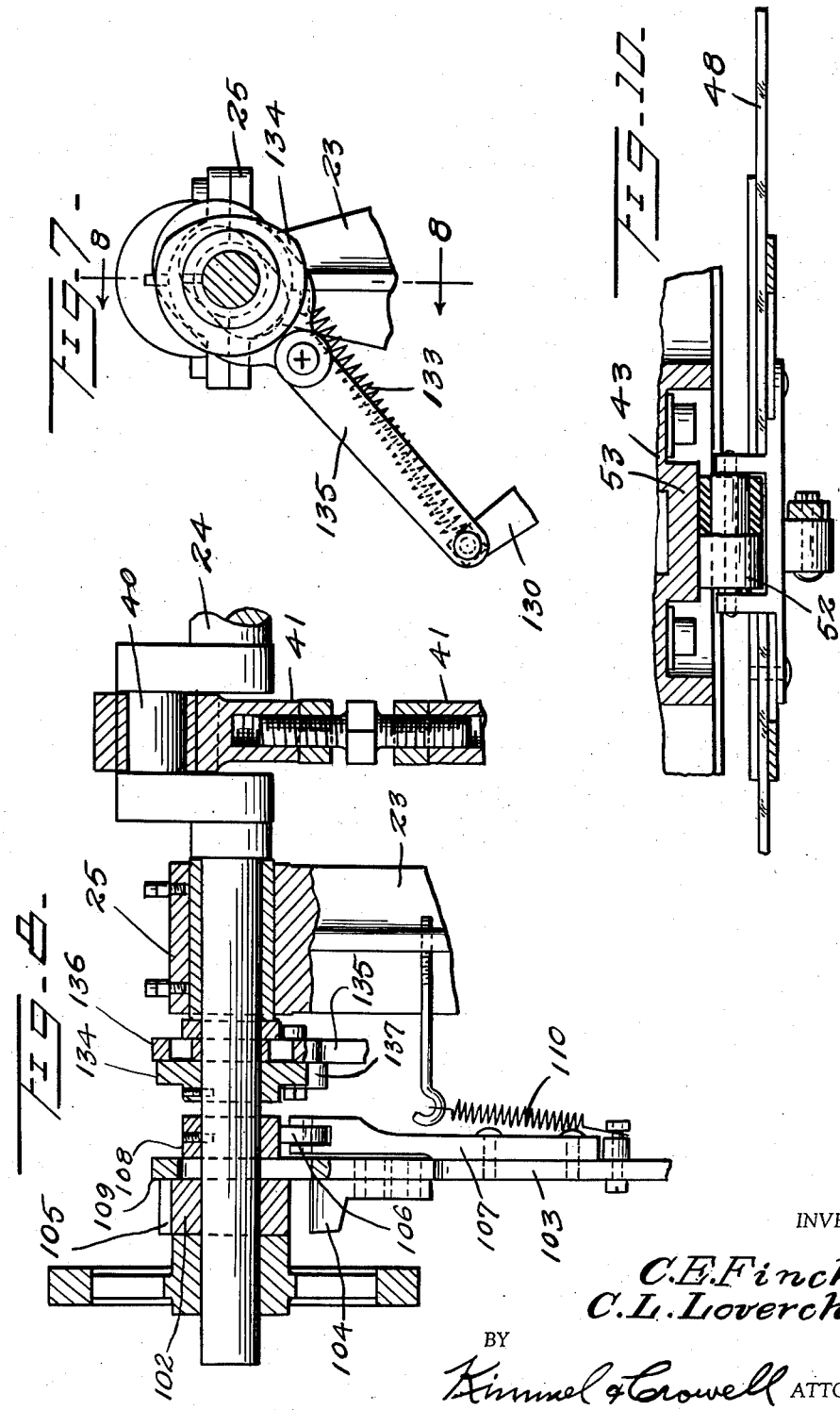

United States Patent Office 2,763,324
Patented Sept. 18, 1956

2,763,324

INDEX CUTTER HAVING WORK CARRIAGE MOVABLE RELATIVE TO THE CUTTER

Charles Lester Loverch, Brooklyn, and Christian Edward Finck, Bronx, N. Y.; said Loverch assignor to said Finck Application March 14, 1952, Serial No. 276,606

4 Claims. (Cl. 164—59)

This invention relates to an index cutter, and is an improvement over the construction shown in Patents No. 417,536, issued December 17, 1889, and No. 453,103, issued May 26, 1891.

An object of this invention is to provide an improved index cutter for cutting the edges of pages of a folio or the like, which includes an improved means for automatically and progressively shifting the carriage as each cut is made.

Another object of this invention is to provide in an index cutter an improved adjustable means for stopping the carriage after each cut is made.

A further object of this invention is to provide in an index cutter an improved guard for the movable knife which is normally in covering position with respect to the movable knife, and is shifted to uncovering position by movement of the knife to cutting position.

A further object of this invention is to provide in an index cutter, a work carriage movable relative to the cutter with pressure operated means for shifting the carriage and means for cushioning the movement of the carriage so as to eliminate jars incident to the step-by-step movement of the carriage.

With the above and other objects in view, my invention consists in the arrangement, combination and details of construction disclosed in the drawings and specification, and then more particularly pointed out in the appended claims.

In the drawings:

Figure 1 is a detailed front elevation of an index cutting machine constructed according to an embodiment of this invention.

Figure 2 is an end elevation partly broken away of the machine.

Figure 3 is a sectional view taken on the line 3—3 of Figure 2.

Figure 4 is a fragmentary sectional view taken on the line 4—4 of Figure 3.

Figure 5 is a sectional view taken on the line 5—5 of Figure 1.

Figure 6 is a fragmentary sectional view taken on the line 6—6 of Figure 1.

Figure 7 is a fragmentary sectional view taken on the line 7—7 of Figure 1.

Figure 8 is a fragmentary sectional view taken on the line 8—8 of Figure 7.

Figure 9 is a fragmentary end elevation of the carriage and operator therefor.

Figure 10 is a fragmentary sectional view taken on the line 10—10 of Figure 1.

Figure 11 is a fragmentary front elevation of the cutter guard.

Figure 12 is a fragmentary transverse section of the pressure cylinder and valve associated therewith.

Figure 13 is a fragmentary sectional view taken on the line 13—13 of Figure 12.

Figure 14 is a fragmentary sectional view taken on the line 14—14 of Figure 12.

Figure 15 is a semi-schematic horizontal cross-section illustrating the hydraulic cylinder, piston and carriage relationship.

Referring to the drawings, the numeral 20 designates generally a base which is mounted on a support 21. The base 20 has secured thereto an upstanding frame 22, and a pair of bearing supports 23 are secured to and extend upwardly from the upper end of the frame 22. A crank shaft 24 is journalled in bearings 25 mounted on the supports 23, and one end of the crank shaft 24 has mounted thereon a wheel or pulley 26. A motor or power member 27 is mounted on a rearwardly projecting platform 28 carried by the base 20, and an endless belt 29 is trained about the pulley 26 and a driving pulley 30 carried by the power member 27. A clutch means 31 of conventional construction is mounted partly on the inner side of pulley 26 and partly on the shaft 24, and the clutch 31 includes, as shown in Figure 6, a clutch release collar 32 which is of cam shape and includes a step 33 adapted to be engaged by a clutch releasing pawl 34.

The pawl 34 is carried by a bellcrank lever 35 rockably mounted on a pivot 36. A pedal 37 is rockably disposed below the supporting member 21 and is connected with the bellcrank 35 by means of a connecting rod or link 38. A spring 39 is connected between the bellcrank 35 and an adjacent bearing support 23 for constantly urging the pawl 34 inwardly to clutch releasing position.

The shaft 24 is formed with a crank offset 40, which is engaged by the upper end of an extensible pitman 41. The pitman 41 is rockably connected at its lower end, as at 42, to a vertically slidable knife carriage 43. The carriage 43 is slidable in vertical disposed guides 44 carried by the forward side of the upright frame 22. The knife carriage 43 has secured thereto an L-shaped cutter 45 which is adapted to be moved downwardly into cutting engagement with a stationary L-shaped knife member 46.

The knife member 46 is carried by a forwardly projecting support 47, which is fixed to the frame 22. A shield or knife guard 48 is dependingly carried by a pair of vertically disposed supporting bars 49, which are fixed at their upper ends to a horizontal shaft 50 carried by a pair of forwardly projecting bearing arms 51. The guard 48 is adapted to be shifted outwardly into knife uncovering position by means of a roller 52, which engages a guard shifting cam 53 which is fixed to the forward side of the knife carriage 43.

The shaft 50 has fixed to one end thereof a lever 54, and a spring 55 is connected between the lever 54 and the upper portion of the frame 22. As the knife carriage 43 moves downwardly, cam 53 will move guard 48 outwardly so that knife 45 may engage stationary knife 46.

The base 20 has secured to the forward portion thereof a pair of confronting carriage guides 56, which are supported above the base 20 by upwardly projecting supporting members 57. A work supporting carriage 58 is slidable in the guides 56 and has secured to the upper side thereof upwardly projecting supports 59 disposed one adjacent each end of the carriage 58. A work supporting table 60 is disposed above the supports 59 and is provided adjacent each end thereof with vertically disposed studs 61 which are vertically adjustable in the horizontal arms 62 of the supports 59.

A work clamping bar 63 is pivotally carried by a U-shaped member 64, which is vertically adjustable in a laterally projecting arm 65 carried by one of the supports 59. The outer end of the clamping bar 63 projects beyond the pivot member 64, and a spring 66 is connected at one end to the clamping member 63 and at the other end to a laterally projecting bar 67, which is carried by the threaded shank 68. The shank 68 has the U-shaped pivot member 64 secured to the upper end thereof, and shank 68 is vertically adjustable through the arm 65. The opposite or free end of the clamping bar 63 engages in an upright looped guide 69 which is carried by a stud 70 vertically adjustable through the horizontal arm 62. A spring pressed locking or latch member 71 engages over the clamping bar 63 and is adapted to hold the latter in work clamping position. The work, such as a folio or blank book, is adapted to be clamped between the clamping bar 63 and the table 60 and is adapted to project inwardly in the direction of the stationary or lower knife blade 46.

The carriage 58 is adapted to be progressively moved lengthwise of the guides 56 by means of a plunger 72, which is slidable in an elongated pressure cylinder 73. The cylinder 73 is fixed relative to the inner one of the guides 56 by means of an L-shaped supporting member 74, which is secured to one head 75 of the cylinder 73. A plunger rod 76 operable by plunger 72 is slidable through a second head 77 secured to the cylinder 73, and the rod 76 is secured to the carriage 58 by means of an elongated bar 78, which is fixed at one end to the carriage 58 and is connected with the outer end of the plunger rod 76 by means of an L-shaped connector 79.

A spring 80 is mounted within the cylinder 73 and bears at one end against the head 75 and bears at the other end against the piston or plunger 72 so as to constantly urge the latter to the right, as viewed in Figure 3. The cylinder 73 is adapted to be connected by means of a pipe 81 to a source of pressure supply, such as air or the like, and the pipe 81 is connected to a control valve structure 82, which is mounted on the head 75.

The valve structure 82, which is shown in Figures 12, 13 and 14, includes an intake passage 83, which is of L-shaped and is intersected by a cylindrical valve plug 84 which is slidable in a bore 85. The plug 84 is normally urged to port closing position by means of a spring 86, and plug 84 is formed between the ends thereof with an annular groove 87, which is normally in registry with an outlet port 88 communicating with the inner end of the L-shaped passage 83.

The port 88 connects with an opening 89 formed in the housing 82 and the opening 89 communicates with a longitudinally extending passage 90 disposed longitudinally of the cylinder 73 and communicating at the opposite end of cylinder 73 with the interior of the latter through the opposite end head 77. When the valve plug 84 is in closed position with respect to the intake port 83, this plug is in open position with respect to an air release port 91 formed in the valve housing 82 and communicating with bore 85.

A screw plug 92 is threaded into the housing 82 and is adapted to regulate the amount of air released through the release port or passage 91. The cylinder 73 is communicated with the atmosphere through the head 75 by means of a passage 93, which communicates at one end with the interior of cylinder 73 and communicates with an air release passage 94 formed in the valve member or housing 82.

A screw plug 95 is threaded into the housing or body 82 and is adapted to control the amount of air released through the passage 94. The adjustment of the screws 92 and 95 will regulate the volume of air released to the atmosphere so as to thereby form a cushion effect with respect to the movement of the piston 72. When piston 72 moves to the right, as viewed in Figure 3, under tension of spring 80, air will be admitted to the left-end of cylinder 73 through passage 94. The position of screw 95 will regulate the speed of movement of piston 72 under the action of spring 80. When piston 72 is moving to the left under the pressure of air admitted to the right end of cylinder 73, air in the left end of cylinder 73 may be discharged through passage 94. The plunger or piston 72 not only affords a means for moving the carriage back to a starting position, or to the left as viewed in Figure 3, but it also acts as a dashpot to cushion the movement of carriage 58 under the action of spring 80.

An elongated threaded carriage stop bar 96 is carried by the carriage 58 and has mounted thereon a plurality of adjustable tapered stops 97. A carriage stop lever or dog 98 is carried by a rock lever 99, which is rockably carried by a pivot member 100. The pivot member 100 is secured to a horizontally projecting supporting arm 101, which is fixed to the frame 22. The lever 99 is adapted to be rocked upwardly to released position by means of a cam lobe 105 which is fixed on the crank shaft 24.

An elongated bar 103 has fixed to the upper end thereof a cam engaging lug 104 which is adapted to be engaged by the cam lobe 105 carried by a hub 102 secured to the shaft 24. A roller 106 is carried by a bar 107 which is fixed to bar 103, and roller 106 engages as collar 108 which is secured to shaft 24. The upper end of bar 103 is formed with an elongated loop 109, through which the shaft 24 loosely engages, and bar 103 is constantly urged upwardly so that roller 106 will engage collar 108 by means of a spring 110. At each revolution of shaft 24, cam lobe 105 will strike lug 104 and press bar 103 downwardly. Downward movement of bar 103 will raise lever 99 and dog 98 to a released position.

The valve plug 84 has secured thereto a stem 111 which is adapted to be engaged by a dog 112 secured to a rock shaft 113. A bar or lever 114 is secured to and extends forwardly from the shaft 113 and is connected to a crank arm 115 carried by a horizontal valve operating shaft 116 by means of a link 117. The shaft 116 has fixed thereto a lever arm 118, and the upper end of a valve operating link or bar 119 is secured to arm 118 and is secured at its lower end to a pedal or operator 120.

The carriage 58 is movably supported by means of an elongated guide bar 121 which is secured to and projects lengthwise from head 77. A roller 122 carried by an arm 123, which is fixed to the connecting member 79, engages the guide 121. Guide 121 cooperates with guides 56 in slidably supporting the carriage 58.

The carriage 58 is adapted to be manually moved in either direction by means of a shaft 124 which is journalled below the carriage 58 in the base 20 and has a spur gear 125 fixed to the inner end thereof. The gear 125 meshes with an elongated gear rack 126, which is fixed to the inner portion of the carriage 58. A hand wheel 127 is secured to the forward end of shaft 124.

An L-shaped leaf support 128 is fixed to a horizontally disposed slide 129, which is slidably carried by the frame 22 and is movable forwardly and rearwardly in timed relation with respect to the movement of the knife carriage 43. The page or pages which are to be cut by the cutters are adapted to initially rest on the horizontal portion of the support 128, and when the movable knife 45 is in cutting position, support 128 is adapted to be moved rearwardly to disengaged position by means of an elongated lever 130. The lever 130 is connected at its lower end by means of a link 131 with the slide 129. Lever 130 is pivotally mounted between the ends thereof on a pivot member 132.

A spring 133 is connected between the upper end of lever 130 and one of the bearing supports 23 so as to constantly urge lever 130 to swing rearwardly at its lower end to a disengaging position with respect to the page support 128. A lever operating cam 134 is fixed on the shaft 24, and a link 135 is pivotally connected at its rear and lower end with the upper end of lever 130 and is formed with an elongated loop 136 loosely engaging about shaft 24.

A cam engaging roller 137 is carried by the link 135 so that the latter will be moved rearwardly and downwardly to effect movement of lever 130 to a position where support 128 will be disposed in a position to engage a page or pages about to be cut by the cutters. A table 138 is supported below the work table 60 by means of a pair of supports 139 which are fixed to the carriage 58. The table 138 inclines downwardly and inwardly and has an upstanding flange 140 at its inner end to hold the material placed on table 138 from sliding inwardly with respect to the machine. After closure member 98 is raised by cam lobe 105 to enable spring 80 to move the carriage it is lowered by the latter so as to enable the carriage to stop when the next stop 97 engages release member 98.

In the use and operation of this machine, the folio or book which is to be cut for indexing is clamped between the table 60 and the clamping bar 63, with the free edges of the pages projecting inwardly so as to project over the stationary cutter 46. The worker in operating the machine is adapted to bend the inner edges of the pages upwardly and release the pages progressively as the machine is operated. When the first page or pages are dropped downwardly onto the stationary cutter or knife 46, pedal 37 is rocked downwardly so as to pull dog or pawl 34 to released position whereby crank shaft 24 will rotate with pulley 26. Crank shaft 24 is adapted to rotate for one complete revolution at a time and in this rotation of crank shaft 24, movable knife 45 will be moved downwardly so as to cut the page or pages engaging on stationary knife 46. As knife 45 engages knife or blade 46, support 128 is moved rearwardly by rocking of lever 130 and when knife 45 is moving downwardly to a cutting position, guard 48 will be moved outwardly by cam 53 to an uncovering position with respect to knife 45.

When carriage 43 is moving upwardly on its return stroke, cam lobe 105 will effect upward movement of release member 98 so that spring 80 will be able to move piston 72 and carriage 58 to the right, as viewed in Figure 3. Carriage 58 will be moved for the distance between a pair of spaced stops 97. After the carriage 58 has moved for one complete stroke to the right, as viewed in Figure 3, depression of pedal 120 will admit air pressure to the right end of cylinder 73 so that carriage 58 will be moved to the left at its initial or starting position. The stop members 97, as shown in Figure 3, are of cam or tapered shape so that they will rock stop arm 98 upwardly as the carriage 58 is moved to its starting position. The adjustment of the air release plugs 92 and 95 will provide for the cushioned movement of the carriage 58 in either direction of the carriage movement. When pedal 120 is depressed, valve plug 84 will be moved inwardly so that the groove 87 will be in registry with the port 83 and thereby admit air through port 89 to longitudinal passage 90. At the time valve plug 84 is moved inwardly by depression of pedal 120, release passage 91 will be closed.

I do not mean to confine myself to the exact details of construction herein disclosed, but claim all variations falling within the purview of the appended claims.

What is claimed is:

1. An index cutter comprising a frame, a stationary blade carried by said frame, a movable blade, means for moving said movable blade relative to said stationary blade, a horionztally movable carriage carried by said frame, work clamping means carried by said carriage, a means for moving said carriage, said means comprising a plunger connected to said carriage, fluid pressure means directed against one side of the plunger for moving the carriage in one direction and a spring engaging the opposite side of the plunger for moving the carriage in the opposite direction, valve means controlling the admission of fluid to said plunger, a plurality of spaced stops carried by said carriage, a rockable stop engaging member carried by said frame adapted to hold said carriage against movement in said opposite direction, and cam operated means correlated with the movement of said movable blade for rocking said stop engaging member to released position and lowering said stop engaging member to enable the next stop to engage said stop engaging member.

2. An index cutter comprising a frame, a stationary blade carried by said frame, a movable blade, means for moving said movable blade relative to said stationary blade, a horizontally movable carriage carried by said frame, work clamping means carried by said carriage, a means for moving said carriage, said means comprising a plunger connected to said carriage, fluid pressure means directed against one side of the plunger for moving the carriage in one direction and a spring engaging the opposite side of the plunger for moving the carriage in the opposite direction, valve means controlling the admission of fluid to said plunger, means cushioning the movement of said carriage in either direction, a plurality of spaced stops carried by said carriage, a rockable stop engaging member carried by said frame adapted to hold said carriage against movement in said opposite direction, and cam operated means correlated with the movement of said movable blade for rocking said stop engaging member to released position and lowering said stop engaging member to enable the next stop to engage said stop engaging member.

3. An index cutter comprising a frame, a stationary blade carried by said frame, a movable blade, means for moving said movable blade relative to said stationary blade, a horizontally movable carriage carried by said frame, work clamping means carried by said carriage, a means for moving said carriage, said means comprising a plunger connected to said carriage, fluid pressure means directed against one side of the plunger for moving the carriage in one direction and a spring engaging the opposite side of the plunger for moving the carriage in the opposite direction, valve means controlling the admission of fluid to said plunger, means cushioning the movement of said carriage in either direction, a plurality of spaced stops carried by said carriage, a rockable stop engaging member carried by said frame adapted to hold said carriage against movement in said opposite direction, and cam operated means correlated with the movement of said movable blade for rocking said stop engaging member to released position and lowering said stop engaging member to enable the next stop to engage said stop engaging member.

4. An index cutter comprising a frame, a stationary blade carried by said frame, a movable blade, means for moving said movable blade relative to said stationary blade, a horizontally movable carriage carried by said frame, work clamping means carried by said carriage, a means for moving said carriage, said means comprising a plunger connected to said carriage, fluid pressure means directed against one side of the plunger for moving the carriage in one direction and a spring engaging the opposite side of the plunger for moving the carriage in the opposite direction, valve means controlling the admission of fluid to said plunger, a plurality of spaced stops carried by said carriage, a rockable stop engaging member carried by said frame adapted to hold said carriage against movement in said opposite direction, cam operated means correlated with the movement of said movable blade for rocking said stop engaging member to released position and lowering said stop engaging member to enable the next stop to engage said stop engaging member, and said stops and said stop engaging member having cooperating cam surfaces whereby said stop engaging member may ride over said stops when said carriage is moved in said one direction.

References Cited in the file of this patent

UNITED STATES PATENTS

| | | |
|---|---|---|
| 1,749,296 | Moyer | Mar. 4, 1930 |
| 2,153,860 | Barney et al. | Apr. 11, 1939 |
| 2,187,827 | Eickman | Jan. 23, 1940 |
| 2,324,806 | Wachs | July 20, 1943 |